(12) United States Patent
Kojima

(10) Patent No.: US 6,634,664 B1
(45) Date of Patent: Oct. 21, 2003

(54) MULTI-PURPOSE MOUNTING MEMBER FOR BICYCLE

(75) Inventor: Masao Kojima, Izumi (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/699,476

(22) Filed: Oct. 31, 2000

(51) Int. Cl.$^7$ .............................. B62J 11/00; B62J 15/02
(52) U.S. Cl. ................ 280/288.4; 280/202; 280/152.3; 280/852; 224/423; 224/424
(58) Field of Search .............................. 280/288.4, 202, 280/276, 279, 152.1, 152.3, 852, 854, 154, 856, 160.1; 224/416, 418, 423, 424, 425, 426, 447, 452, 459, 929; 362/475, 476, 191

(56) References Cited

U.S. PATENT DOCUMENTS

| | | | |
|---|---|---|---|
| 598,312 A | * | 2/1898 | Carpenter |
| 1,995,795 A | * | 3/1935 | Clark |
| 2,124,222 A | * | 7/1938 | Wiley |
| 2,323,900 A | * | 7/1943 | Dempsey |
| 2,510,222 A | * | 6/1950 | Harley |
| 4,005,874 A | * | 2/1977 | Ohtani .................... 280/288.4 |
| 4,066,290 A | * | 1/1978 | Wiegert et al. ............ 296/78.1 |
| 4,620,713 A | * | 11/1986 | Sakaguchi ............... 280/152.3 |
| 4,852,971 A | * | 8/1989 | Kitrell ....................... 359/550 |
| 5,275,427 A | * | 1/1994 | Gasser .................... 280/152.3 |
| 5,526,240 A | * | 6/1996 | Kuo ............................. 362/72 |
| 6,234,503 B1 | * | 5/2001 | Ockenden ................. 280/204 |

FOREIGN PATENT DOCUMENTS

| | | | |
|---|---|---|---|
| DE | 4215283 | * | 11/1993 |
| JP | 1-111580 | * | 4/1989 |

* cited by examiner

Primary Examiner—Anne Marie Boehler
(74) Attorney, Agent, or Firm—Shinjyu Global IP Counselors, LLP

(57) ABSTRACT

A multi-purpose mounting member for a bicycle fork, especially a front suspension fork, is provided. The multi-purpose mounting member has a rigid front support portion, a rear support portion and a recessed portion that connects the front and rear portions together. The recessed portion forms a mounting space that is sized to receive the inner side surfaces of the forks and the ridge of the fork. Preferably, the multi-purpose mounting member is designed to provide a smooth contoured connection with the front fork. In other words, the mounting space of the multipurpose mounting member is shaped and arranged to provide a very attractive integrated appearance. The front and rear portions are preferably provided with fenders that are adjustable in the longitudinal direction. Moreover, the front support portion is also designed to receive other accessory components, such as an electrical control box, a lamp or a carrier. In other embodiments, the multi-purpose mounting member can be constructed of several pieces. For example, the multi-purpose mounting member can have a plastic lightweight cover and a rigid metal support or holder.

39 Claims, 12 Drawing Sheets

MULTI-PURPOSE MOUNTING MEMBER FOR BICYCLE

BACKGROUND OF THE INVENTION

1. Field of the Invention

This invention generally relates to a multi-purpose mounting member for a bicycle. More specifically, the present invention relates a multi-purpose mounting member for a bicycle that is coupled to the lower tubes of a front suspension fork for supporting bicycle accessory components such as fenders, an electrical control box, a lamp and/or a carrier.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

In particular, many of the new off-road bicycles have front suspension forks to provide a more comfortable ride. The front suspension fork changes the way that various accessories are mounted to the bicycle frame. For example, the bicycle brakes must be mounted to the front suspension forks such that they always remain adjacent to the rims. Accordingly, the lower tubes of the front suspension forks are provided with mounting posts for mounting the bicycle brake thereto. However, the front suspension forks that are currently being marketed do not provide for any additional accessory components to be mounted thereto. Rather, most of the accessory components are mounted to the frame or upper tubes of the suspension fork of the bicycle in a variety of conventional manners. The problem with mounting these accessory components to the bicycle frame or the upper tubes of the suspension fork is that the relationship of the accessory components relative to the wheel and/or ground changes with each compression of the suspension forks.

In view of the above, there exists a need for a multi-purpose mounting member for bicycle which overcomes the above mentioned problems in the prior art. This invention addresses this need in the prior art as well as other needs, which will become apparent to those skilled in the art from this disclosure.

SUMMARY OF THE INVENTION

One object of the present invention is to provide a multi-purpose mounting member for a bicycle that is coupled to the lower tubes of a front suspension fork for supporting bicycle accessory components such as fenders, an electrical control box, a lamp and/or a carrier.

Another object of the present invention is to provide a multi-purpose mounting member for a bicycle that has adjustable fenders.

The foregoing objects can basically be attained by providing a multi-purpose mounting member for a bicycle fork comprising a rigid front support portion, a rear support portion and at least one of several accessory components. The front rigid support portion has a first end configured to be located adjacent the bicycle fork and a second end with a front accessory attachment portion. The rear support portion has a first end coupled to the front support portion to form a mounting space between the front and rear support portions with a portion of the bicycle fork being received in said mounting space. At least one of the front and rear support portions is configured with at least one fork mounting portion to be fixedly coupled to the bicycle fork. The accessory component is fixedly coupled to the front support portion via the front accessory attachment portion.

In accordance with certain aspects of the present invention, the front and rear support portions adjustably support front and rear fenders and an accessory component. Examples of some accessory component include an electrical control box, a lamp, a rechargeable battery-powered lamp, a dual lamp and/or a carrier.

In accordance with a preferred aspect of the present invention, the electrical control box preferably includes various conventional components such as a speed sensor, a cycle computer and a rotation sensor for the front wheel, as well as electrical terminals for connection to other electrical devices. Since the internal components of the electrical control box are well known in the bicycle art, these internal components will not be discussed or illustrated in detail herein. Moreover, it will be apparent to those skill in the art from this disclosure that any variety of internal components can be installed in the electrical control box, as needed and/or desired.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
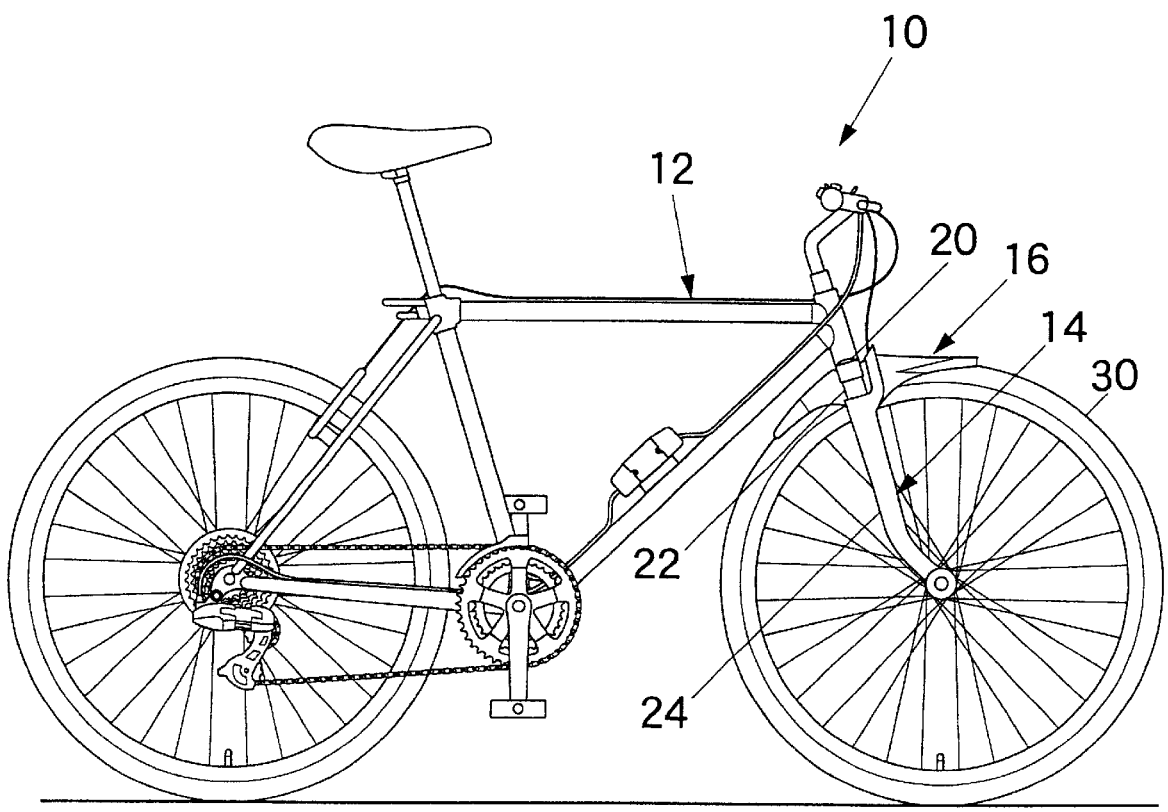
FIG. 1 is a side elevational view of a bicycle with a multi-purpose mounting member coupled thereto in accordance with a first embodiment of the present invention.

Referring initially to FIG. 1, a bicycle 10 (only a portion shown) is illustrated having a frame 12 with a front suspension fork 14 that has a multi-purpose mounting member 16 coupled thereto in accordance with a first embodiment of the present invention as discussed below. Bicycle 10 and its various components are well known in the prior art, except for the multi-purpose mounting member 16 of the present invention. Thus, bicycle 10 and its various components will not be discussed or illustrated in detail herein, except for the components that relate to the present invention.

As used herein, the following directional terms "forward, rearward, upward, above, downward, vertical, horizontal, below and transverse" as well as any other similar directional terms refer to those directions of a bicycle in its normal riding position, with the multi-purpose mounting member 16 attached thereto. Accordingly, these terms, as utilized to describe the multi-purpose mounting member 16 in the claims, should be interpreted relative to bicycle 10 in its normal riding position.

Figure 2:
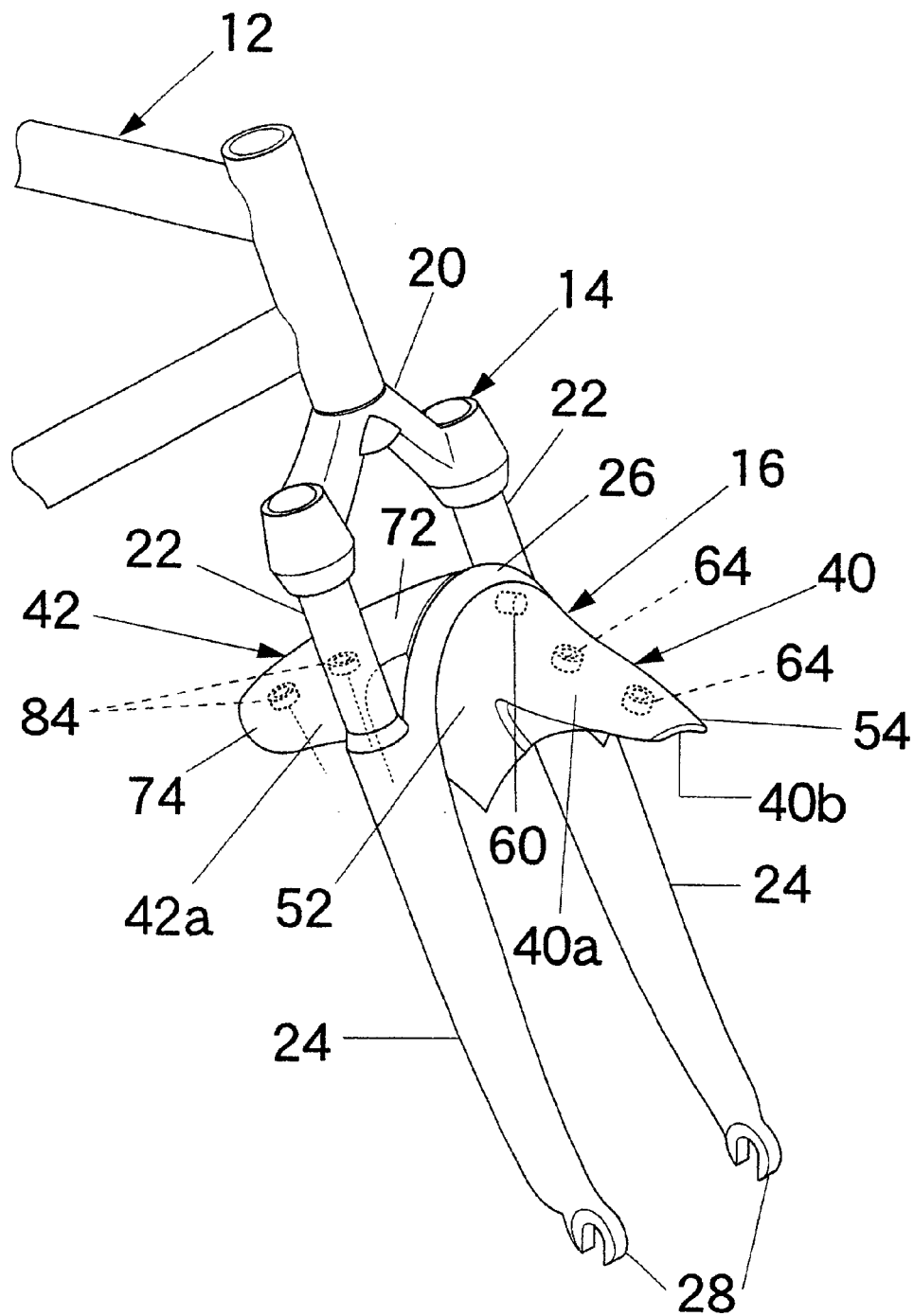
FIG. 2 is a perspective view of the front portion of the bicycle frame with a front suspension fork and the multi-purpose mounting member in accordance with the first embodiment of the present invention.

Referring now to FIG. 2, the front suspension fork 14 illustrated herein utilizes relatively conventional technology, and thus, will not be discussed or illustrated in detail herein except as needed to describe the present invention. Basically, the front suspension fork 14 basically includes an attachment component 20, a pair of upper tubes 22 and a pair of lower tubes 24 movably coupled to the upper tubes 22. The lower tubes 24 are rigidly coupled together by a bridge 26. The attachment component 20 is a conventional member having a post (not shown) mounted within the frame 12 and a lower end coupled to the upper ends of the upper tubes 22. The lower ends of the upper tubes 22 are located within the upper ends of the lower tubes 24 with an elastomeric member located therebetween in a conventional manner. For example, each of the lower tubes 24 can be provided with a coil spring that engages the lower ends of the upper tubes 22 for providing a shock absorbing effect in a conventional manner. The lower tubes 24 also preferably have brake mounting structures (not shown) and wheel mounting flanges 28 at their lower free ends for rotatably mounting the front wheel 30 in a conventional manner.

The multi-purpose mounting member 16 is preferably mounted on the bridge 26. Of course, the multi-purpose mounting member 16 can be coupled directly to the lower tubes 24 and/or the bridge 26. In the first embodiment, the multi-purpose mounting member 16 is a one-piece, unitary member. However, the multi-purpose mounting member 16 can be constructed of several pieces as seen in the later embodiments. In this embodiment, the multi-purpose mounting member 16 can be constructed by casting of a lightweight material, preferably a metallic material such as aluminum. Alternatively, the multi-purpose mounting member 16 can be formed by pressing a metal sheet material or any other rigid material that will carry out the present invention.

In this embodiment, the multi-purpose mounting member 16 basically includes a rigid front support portion 40, a rigid rear support portion 42 and a rigid recessed portion 44 that connects the front and rear support portions 40 and 42 together. The recessed portion 44 forms a mounting space 46 that is sized to receive the inner side surfaces of the lower tubes 24 and the lower surface of the bridge 26. As explained below, the mounting space 46 is preferably designed to provide a smooth contoured connection with the lower tubes 24 and the bridge 26. In other words, the mounting space 46 of the multi-purpose mounting member 16 is shaped and arranged to provide a very attractive integrated appearance.

Figure 3:
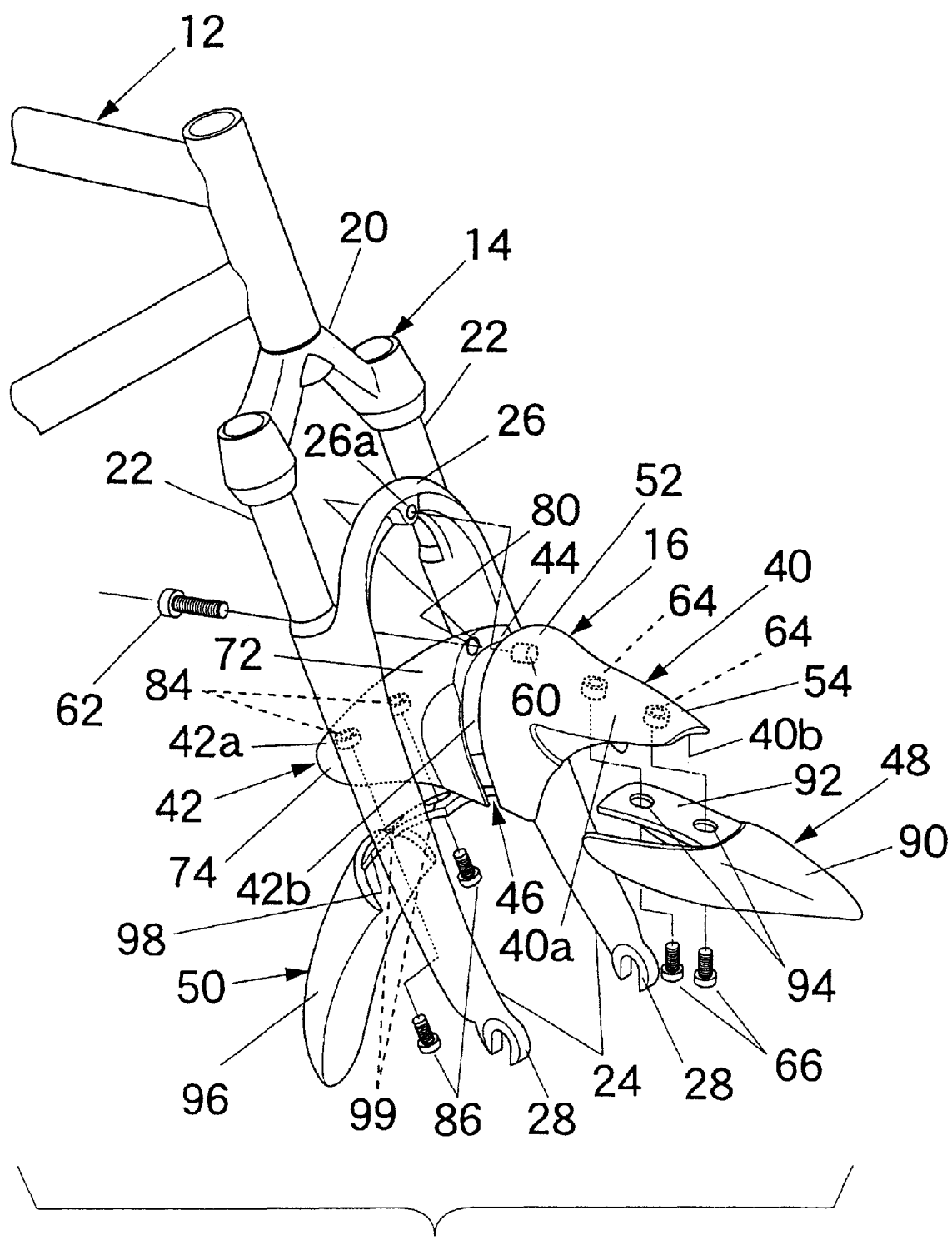
FIG. 3 is an exploded perspective view of the front portion of the bicycle frame, the multi-purpose mounting member and an accessory component (fender) in accordance with the first embodiment of the present invention.
Figure 4:
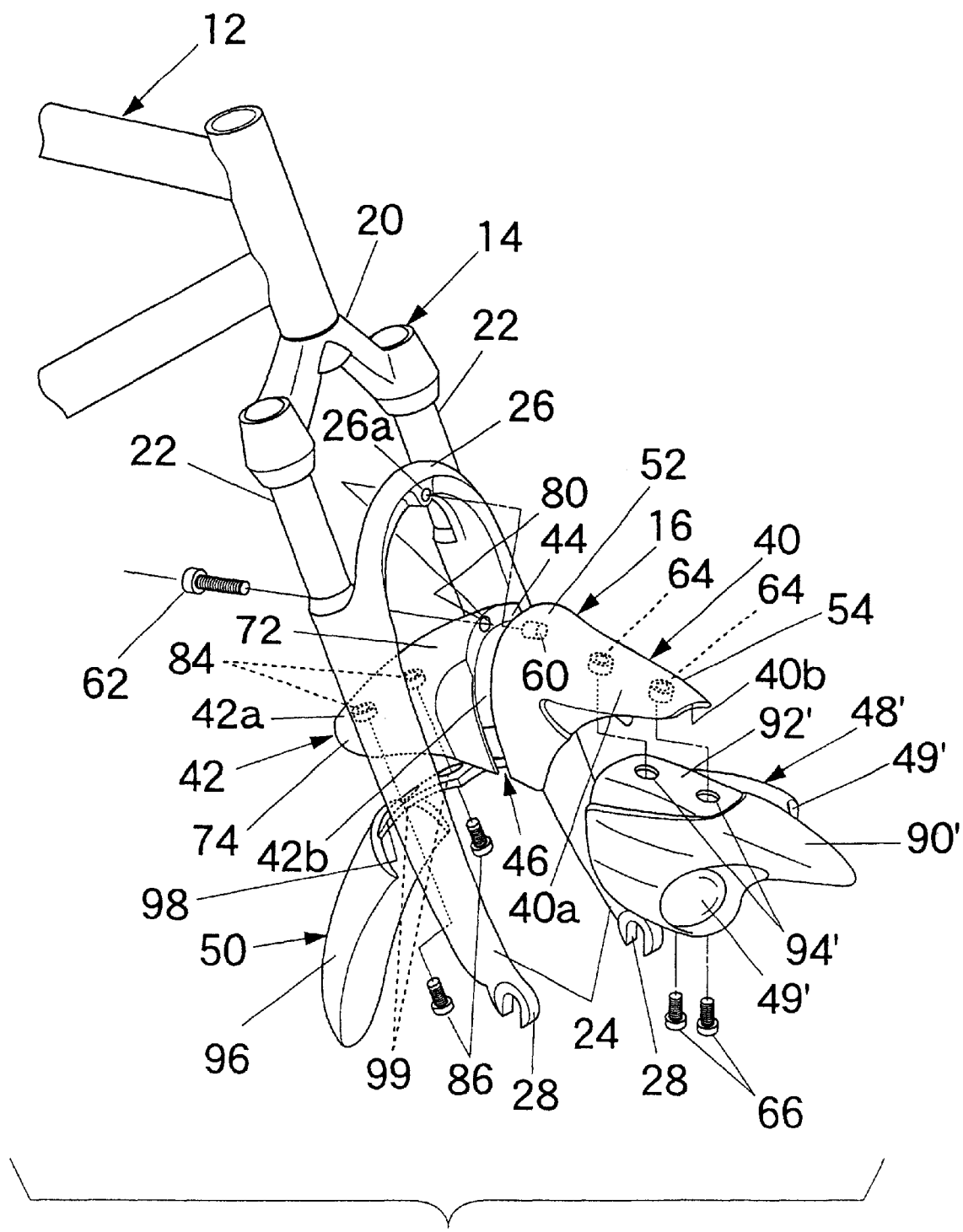
FIG. 4 is an exploded perspective view of the front portion of the bicycle frame, the multi-purpose mounting member and an accessory component (fender with integrated lamps) in accordance with the first embodiment of the present invention.
Figure 5:
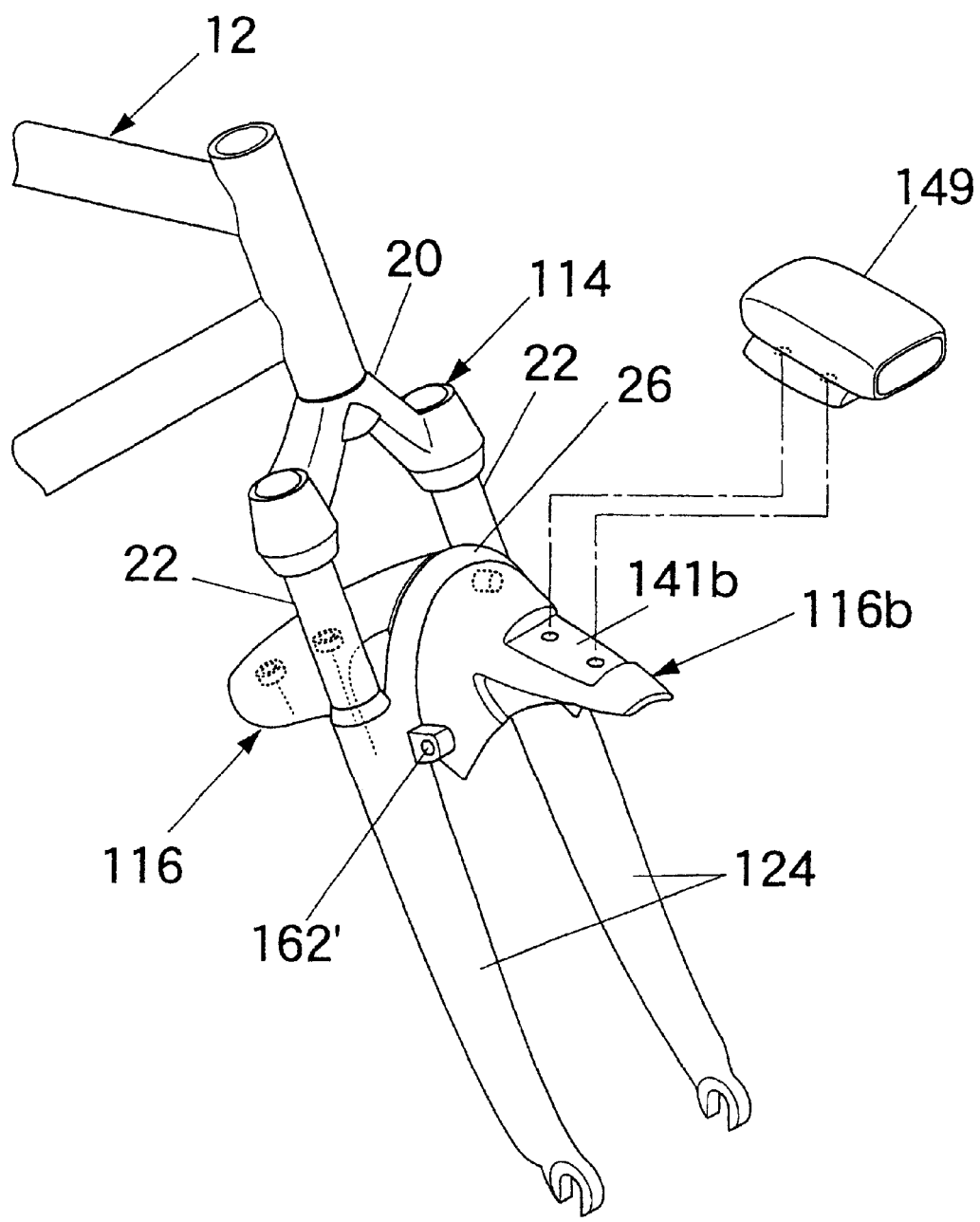
FIG. 5 is a perspective view of the front portion of the bicycle frame with a front suspension fork, a multi-purpose mounting member and an electrical control box in accordance with a second embodiment of the present invention.

Referring to FIGS. 3 and 4, the front support portion 40 adjustably supports an accessory component such as a front fender 48 or a front fender 48' with integrated lamps 49', while the rear support portion 42 adjustably supports a rear fender 50. The fenders 48, 48' and 50 can be constructed of a non-metallic material such as a more flexible plastic material. Of course, it will be apparent to those skilled in the art from this disclosure that other types of accessory components can be attached to the multipurpose mounting member 16 by making minor modifications that do not depart from the present invention.

The front support portion 40 has a first end 52 formed at the recessed portion 44 and a second free end 54 that supports either the fender 48 or the fender 48'. The first end 52 of the front support portion 40 flares outwardly relative to the second end 54. More specifically, the front support portion 40 has a convexly curved upper surface 40a and a concaved lower surface 40b relative to the longitudinal center plane of the multi-purpose mounting member 16. Preferably, the front support portion 40 also is curved along the longitudinal axis of the multi-purpose mounting member 16 such that the curvature is similar to that of the bicycle wheel 30. The first end 52 flares out in a cone-shaped manner such that the end surface of the first end 52 overlies portions of the lower tubes 24 and the bridge 26 to provide an attractive appearance. Moreover, the first end 52 also preferably extends downwardly farther than the second free end 54.

A threaded fork mounting hole 60 is formed at the first end 52 for threadedly receiving a fastener such as a fork mounting bolt 62 for securing the multi-purpose mounting member 16 to the bridge 26 as seen in FIGS. 3 and 4.

The lower surface 40b of the front support portion 40 is also preferably provided with a pair of threaded holes or nuts 64 that receive bolts 66 for securing fender 48 or 48' thereto. The fenders 48 and 48' are adjustably mounted to the front support portion 40 in the longitudinal direction.

The rear support portion 42 is similar in construction to the front support portion 40. Specifically, the rear support portion 42 has a first end 72 formed at the recessed portion 44 and a second free end 74 extending rearwardly from the first end 72. The first end 72 is flared in the same manner as the first end 52 of the front support portion 40, discussed above. Accordingly, the rear support portion 42 is curved in the transverse direction, as well as the longitudinal direction with an upper surface 42a being convexly curved in both directions and a lower surface 42b being concaved in both directions.

The first end 72 of the rear support portion 42 is provided with a fork mounting hole 80 that receives the fork mounting bolt 62 therein. More specifically, mounting bolt 62 is inserted through fork mounting hole 80 and a hole 26a of bridge 26, and then threaded into the threaded mounting hole 60 of the front support portion 40 to rigidly secure the multi-purpose mounting member 16 to front suspension fork 14.

The rear support portion 42 is also provided with a pair of accessory mounting holes or nuts 84 that are threaded to receive bolts 86 for securing the rear fender 50 thereto. The rear fender 50 is adjustably mounted to the rear portion 42 in the longitudinal direction.

The recessed portion 44 is located between the front and rear support portions 40 and 42 for accommodating portions of the lower tubes 24 and the bridge 26 therein. More specifically, the recessed portion 44 is spaced downwardly from the upper surfaces 40a and 42a of the first ends 52 and 72 of the front and rear support portions 40 and 42. Moreover, the sides of the recessed portion 44 are also spaced inwardly from the sides of the first ends 52 and 72 of the front and rear support portions 40 and 42. This arrangement provides for an attractive appearance as seen in FIG. 2. Moreover, this arrangement allows a single fastener to be utilized to secure the multi-purpose mounting member 16 to the front suspension fork 14.

Referring again to FIGS. 3 and 4, fender 48 is preferably provided with an extension portion 90 and a mounting portion or flange 92 with a pair of longitudinally elongated slots 94 that allow the fender 48 to be extended or retracted relative to the multi-purpose mounting member 16 in the longitudinal direction. Preferably, the mounting portion 92 is slightly recessed from the extension portion 90 so that when the fender 48 is fully retracted, the outer surface of the fender 48 forms a smooth contiguous surface with the upper surface 40a of the support portion 40 to form a smooth surface therebetween. Likewise, the alternate fender 48' with the lamps 49' also has an extension portion 90' and a mounting portion or flange 92' a pair of elongated holes or slots 94'. These elongated holes or slots 94' extend in the longitudinal direction to allow for the fender 48' to be extended and/or retracted relative to the multi-purpose mounting member 16 in the longitudinal direction.

The rear fender 50 has similar structure to the front fender 48. Specifically, the rear fender 50 has an extension portion 96 and a mounting portion 98 with a pair of elongated mounting holes or slots 99. The rear fender is also adjustable in the longitudinal direction so that the rear fender 50 can be retracted or extended relative to the multi-purpose mounting member 16 in the longitudinal direction.

Second Embodiment

Referring now to FIGS. 5–8, a multi-purpose mounting member 116 in accordance with a second embodiment is illustrated in accordance with the present invention. This embodiment is substantially similar to the first embodiment except that the multi-purpose mounting member 116 is constructed of two pieces, e.g., a holder or first piece 116a and a cover or second piece 116b.

Figure 6:
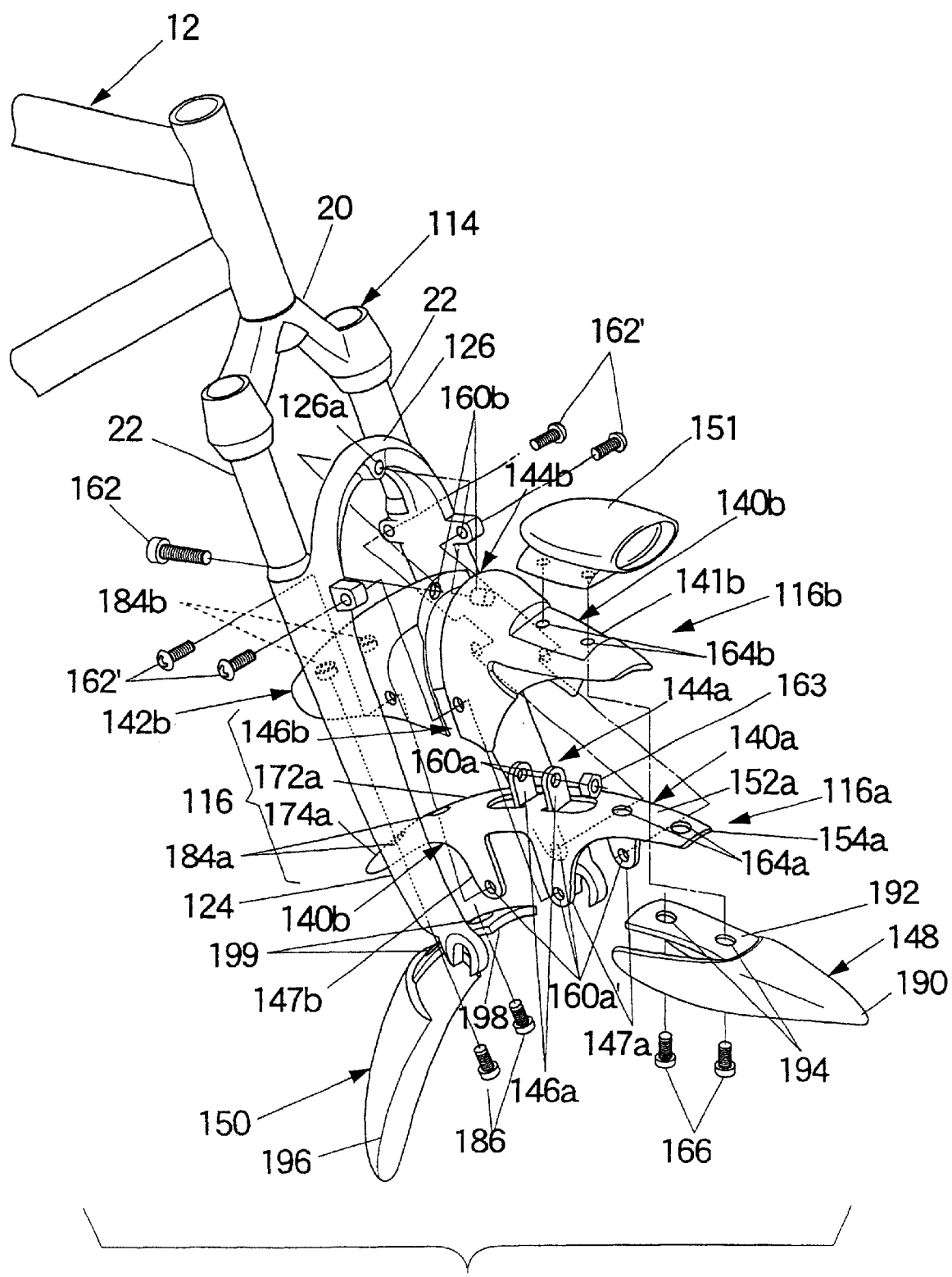
FIG. 6 is an exploded perspective view of the front portion of the bicycle frame, the multi-purpose mounting member and an accessory component (fender and a separate lamp) in accordance with the second embodiment of a present invention.
Figure 7:
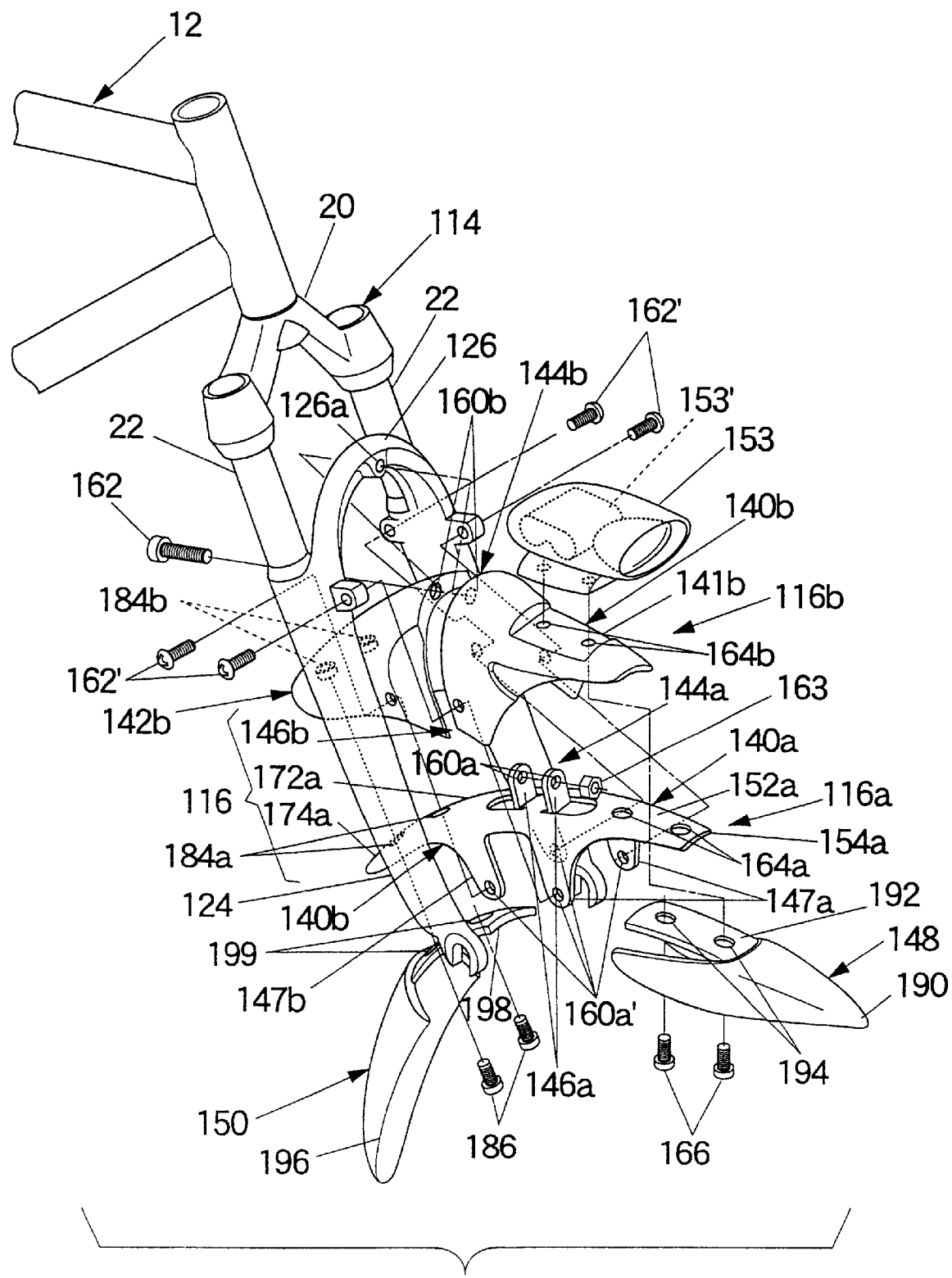
FIG. 7 is an exploded perspective view of the front portion of the bicycle frame, the multi-purpose mounting member and an accessory component (fender and an alternate separate lamp) in accordance with the second embodiment of the present invention.
Figure 8:
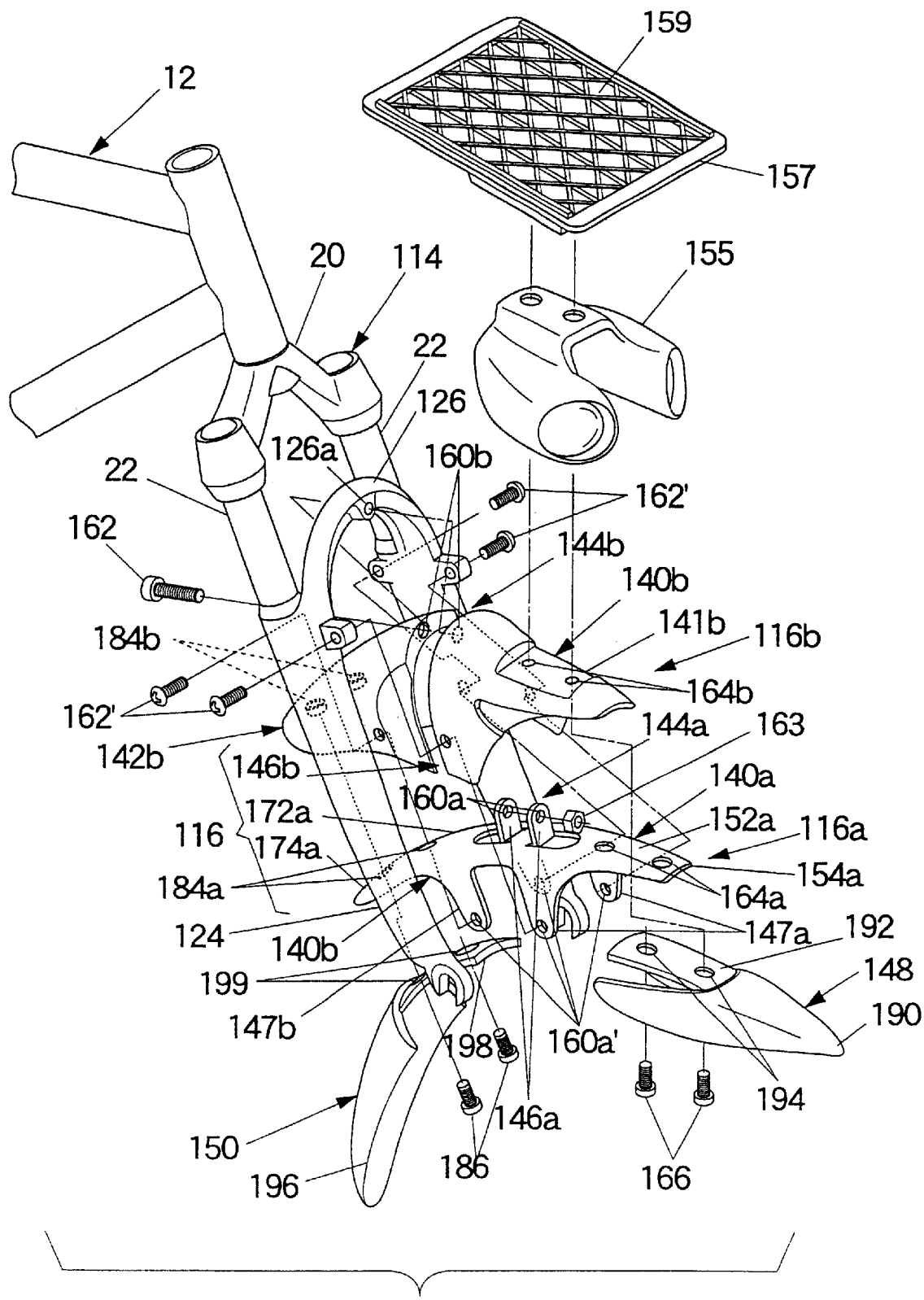
FIG. 8 is an exploded perspective view of the front portion of the bicycle frame, the multi-purpose mounting member and an accessory component (fender, a separate dual lamp and a carrier) in accordance with the second embodiment of the present invention.
Figure 9:
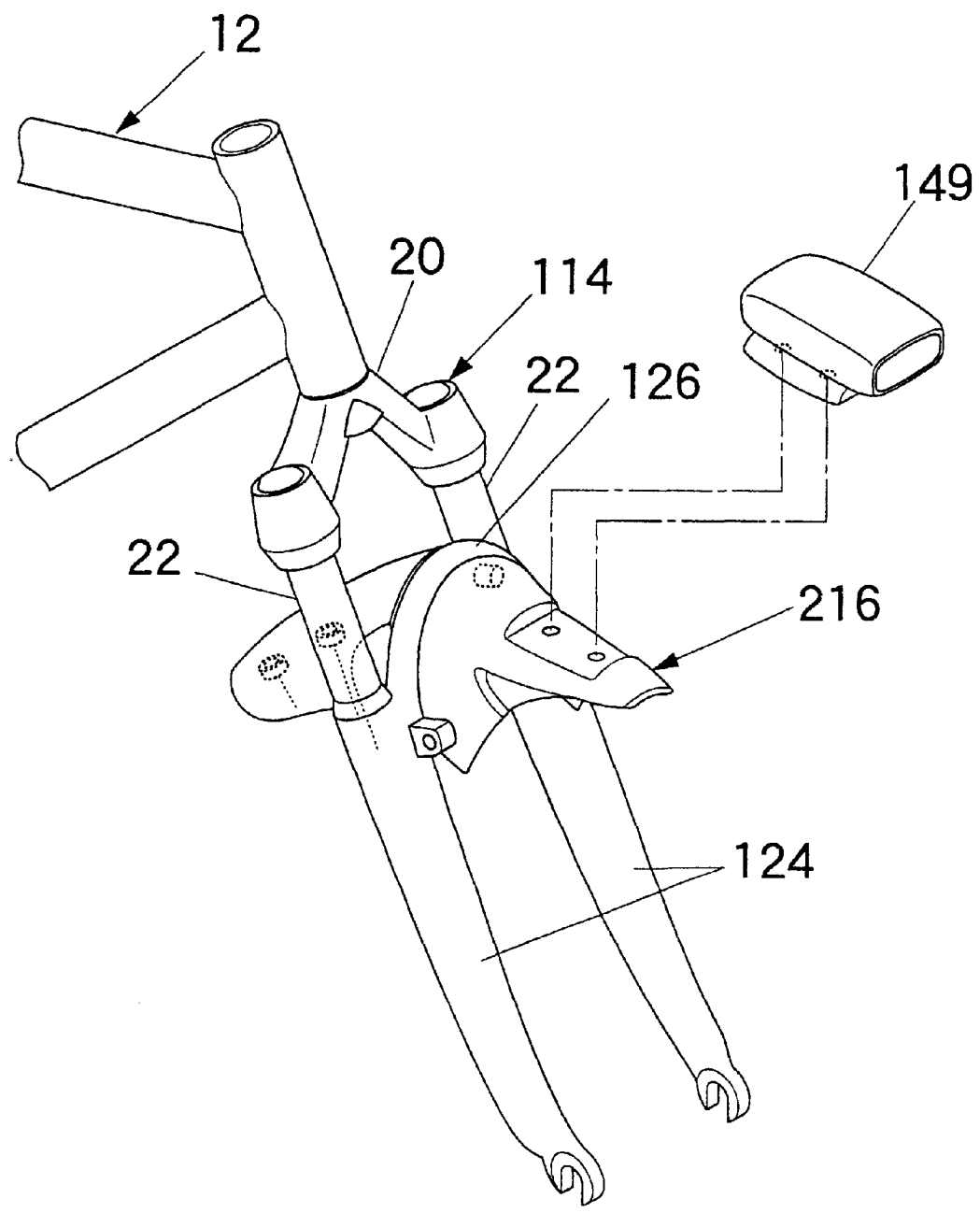
FIG. 9 is a perspective view of the front portion of the bicycle frame with a front suspension fork, a multi-purpose mounting member and an electrical control box in accordance with a third embodiment of the present invention.
Figure 10:
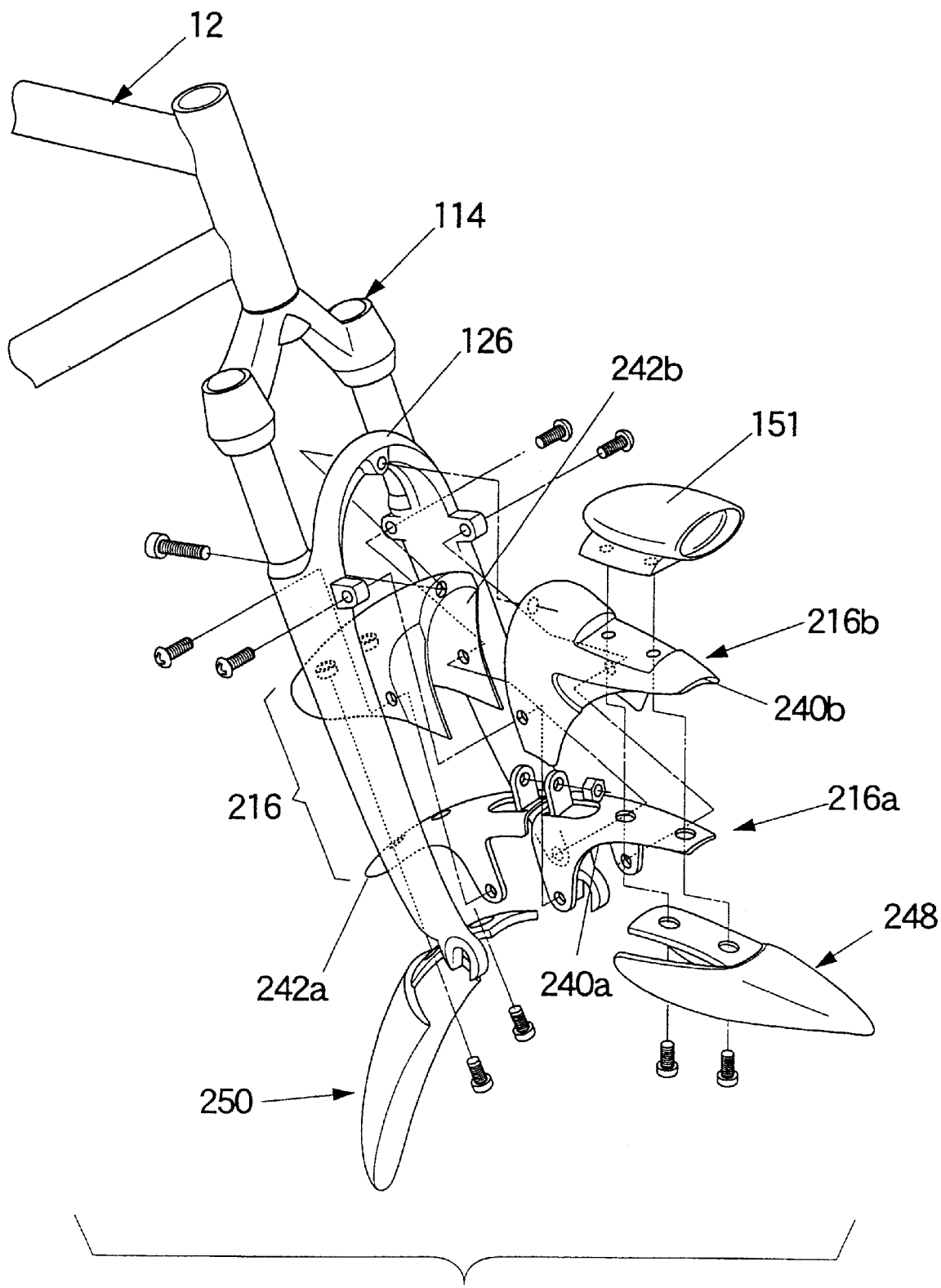
FIG. 10 is an exploded perspective view of the front portion of the bicycle frame, the multi-purpose mounting member and an accessory component (fender and a separate lamp) in accordance with the third embodiment of the present invention.
Figure 11:
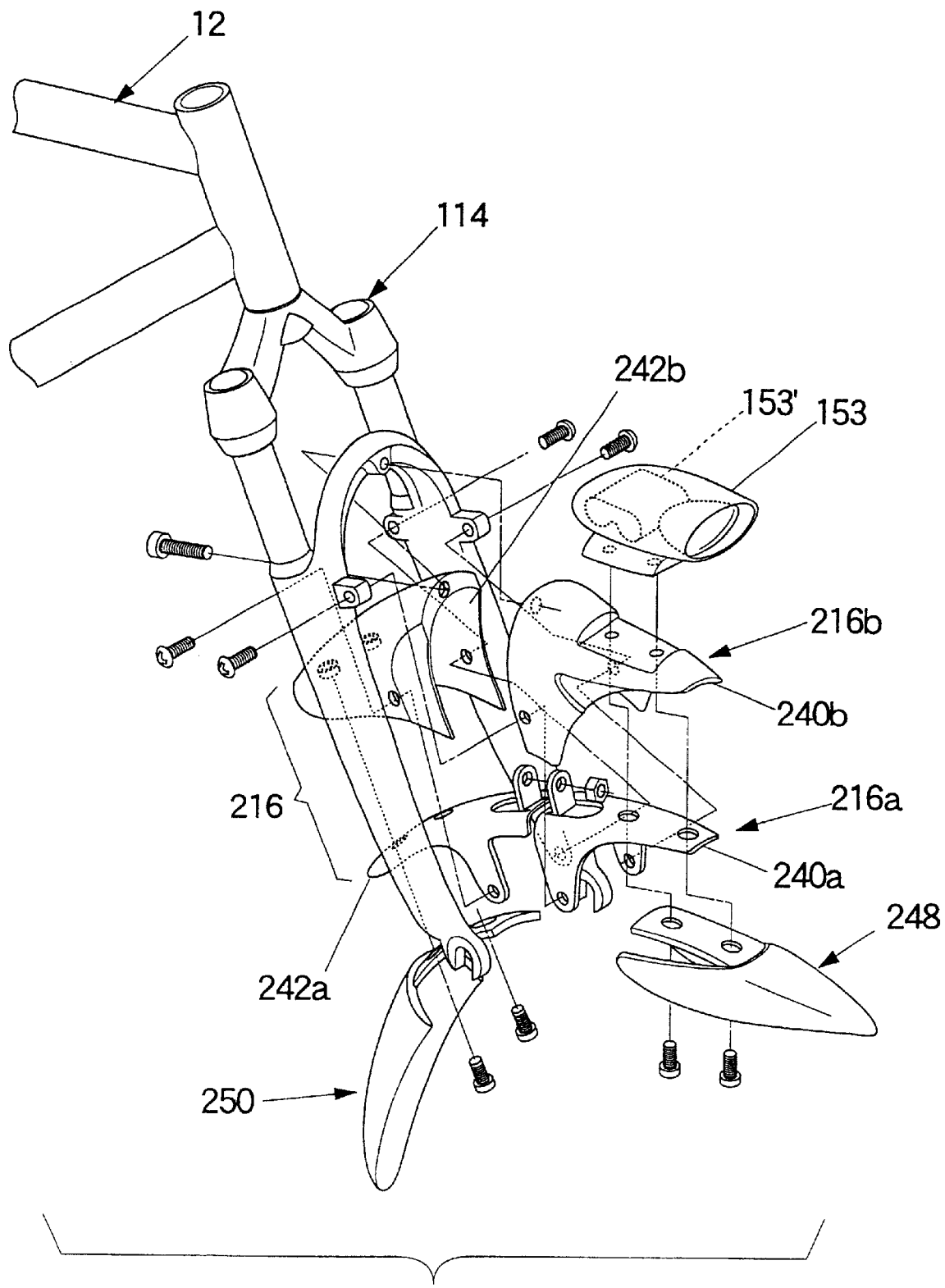
FIG. 11 is an exploded perspective view of the front portion of the bicycle frame, the multi-purpose mounting member and an accessory component (fender and an alternate separate lamp) in accordance with the third embodiment of the present invention.
Figure 12:
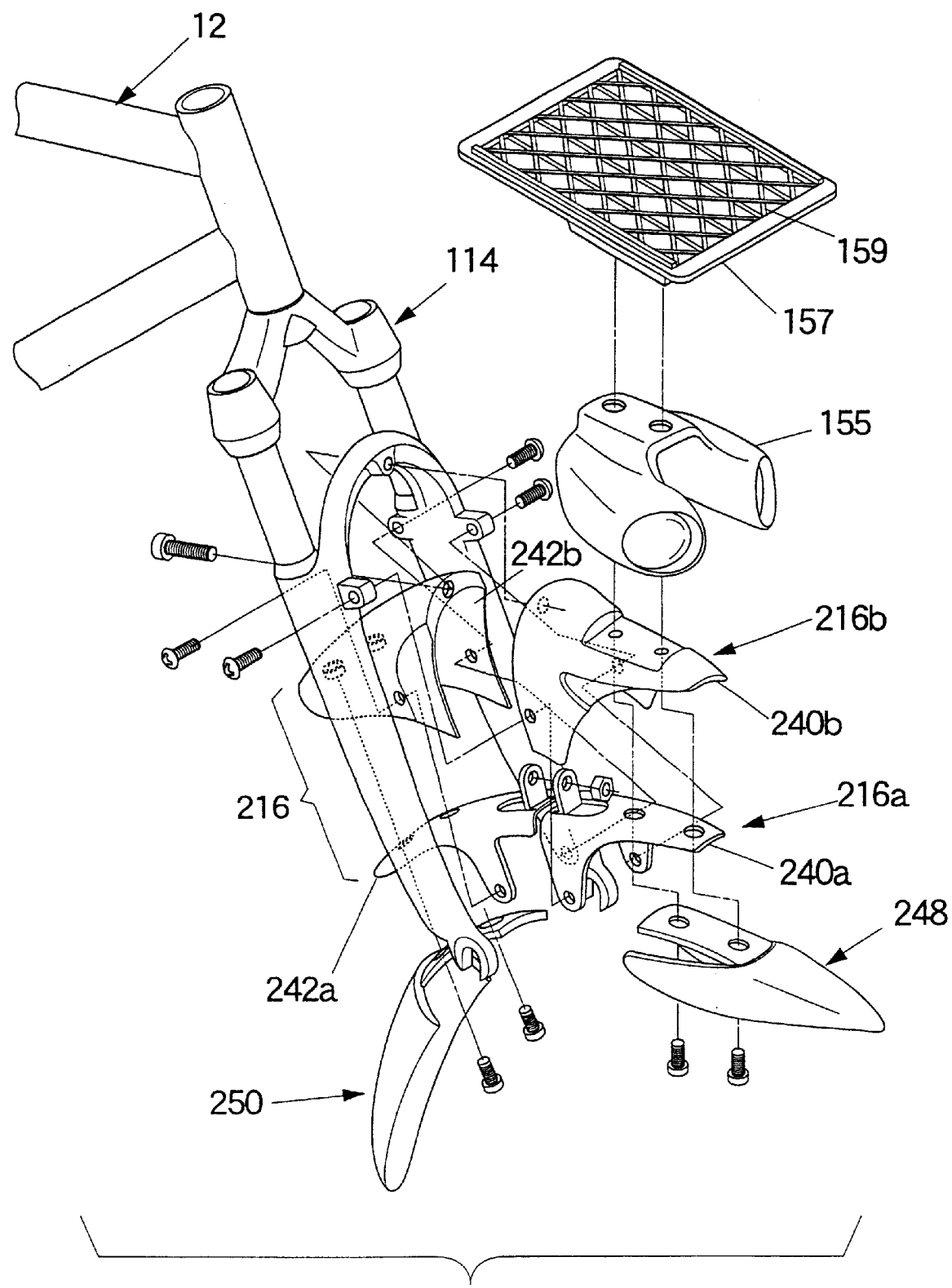
FIG. 12 is an exploded perspective view of the front portion of the bicycle frame, the multi-purpose mounting member and an accessory component (fender, a separate dual lamp and a carrier) in accordance with the third embodiment of the present invention.

In particular, the plastic cover 116b is molded to substantially the same shape as the multi-purpose mounting member 16 of the first embodiment. However, the multi-purpose mounting member 116 has a rigid holder 116a, which is preferably constructed of a one-piece, unitary metallic member. The holder 116a acts as a support for the cover 116b. This embodiment also differs from the first embodiment in that the cover 116b and the holder 116a are also fastened to the lower tubes 124 of a modified front suspension fork 114 by additional fork mounting bolts 162'. Moreover, the upper surface of the cover 116b has a recess 141b for attaching the various accessory components (an electrical control box 149, a lamp 151, a rechargeable battery-powered lamp 153 and a dual lamp 155 with a carrier 157) to the top of the fender 148. As seen in FIGS. 6–8, the various accessory components (the electrical control box 149, the lamp 151, the rechargeable battery-powered lamp 153 and the dual lamp 155 with the carrier 157) can be fastened by bolts 166 to the multi-purpose member 116 in accordance with this embodiment of the present invention.

In this embodiment, the rigid holder 116a is a metallic member that basically includes a rigid front support portion 140a, a rigid rear support portion 142a and a rigid attachment portion 144a. The attachment portion 144a has a pair of mounting flanges 146a with holes 160a to be attached to the bridge 126 by bolt 162 and nut 163. Each of the front and rear support portions 140a and 142a also have a pair of mounting flanges 147a and 147b with holes 160a' for attaching to the lower tubes 124 via bolts 162'.

The front support portion 140a adjustably supports the front fender 148 and an accessory component such as the electrical control box 149, the lamp 151, the rechargeable battery-powered lamp 153, the dual lamp 155 and/or the carrier 157, while the rear support portion 142a adjustably supports the rear fender 150. The fenders 148 and 150 can be constructed of a non-metallic material such as a more flexible plastic material. Of course, it will be apparent to those skilled in the art from this disclosure that other types of accessory components can be attached to the multipurpose mounting member 116 by making minor modifications that do not depart from the present invention.

The front support portion 140a has a first end 152a formed at the attachment portion 144a and a second free end 154a that supports the fender 148 and at least one accessory component. The front support portion 140a has a convexly curved upper surface and a concaved lower surface in a transverse direction relative to the longitudinal center plane of the multi-purpose mounting member 116. Preferably, the front support portion 140a also is curved along the longitudinal axis of the multi-purpose mounting member 116 such that the curvature is similar to that of the bicycle wheel 30.

In the second embodiment, the multi-purpose mounting member 116 is especially designed to support both the fenders 148 and 150 and at least one accessory component via bolts 162. The accessory components other than the fenders 148 and 150 include, but are not limited to the electrical control box 149, the lamp 151, the rechargeable battery-powered lamp 153 and the dual lamp 155 with the carrier 157.

The electrical control box 149 preferably includes various conventional components such as a speed sensor, a cycle computer and a rotation sensor for the front wheel 30, as well as electrical terminals for connection to other electrical devices. Since the internal components of the electrical control box 149 are well known in the bicycle art, these internal components will not be discussed or illustrated in detail herein. Moreover, it will be apparent to those skill in the art from this disclosure that any variety of internal components can be installed in the electrical control box 149, as needed and/or desired.

The rechargeable battery-powered lamp 153 has a battery 153' that is electrically wired to a dynamo that produces AC voltage for charging the battery 153'. The battery 153' is also preferably electrically wired to other bicycle devices, such as a cycle computer, electric shifters, electric motors etc., for supplying DC voltage thereto. Preferably, the carrier 157 has elastic netting 159 coupled thereto such that items can be held on the top surface of the carrier 157 beneath the elastic netting 159. Preferably, each of the accessory components has threaded holes for receiving bolts 166. Thus, mounting holes 164a of the front support portion 140a of the multi-purpose mounting member 116 do not have to be threaded for mounting the accessory components to the front portion 140a of the multi-purpose mounting member 116.

The rear support portion 142a is similar in construction to the front support portion 140a. Specifically, the rear support portion 142a has a first end 172a formed at the attachment portion 144a and a second free end 174a extending rearwardly from the first end 172a Accordingly, the rear support portion 142a is curved in the transverse direction, as well as the longitudinal direction with the upper surface being convexly curved in both directions and the lower surface being concaved in both directions.

The rear support portion 142a is also provided with a pair of accessory mounting holes 184b that are threaded to receive bolts 186 for securing the rear fender 150 thereto. The rear fender 150 is adjustably mounted to the rear portions 142a in the longitudinal direction.

Fender 148 is preferably provided with an extension portion 190 and a mounting portion or flange 192 with a pair of longitudinally elongated slots 194 that allow the fender 148 to be extended or retracted relative to the multi-purpose mounting member 116 in the longitudinal direction.

The rear fender 150 has similar structure to the front fender 148. Specifically, the rear fender 150 has an extension portion 196 and a mounting portion 198 with a pair of elongated mounting holes or slots 199. The rear fender is also adjustable in the longitudinal direction so that the rear fender 150 can be retracted or extended relative to the multi-purpose mounting member 116 in the longitudinal direction.

In this embodiment, the cover 116b basically includes a flexible front support portion 140b, a flexible rear support portion 142b and a flexible recessed portion 144b that connects the front and rear support portions 140b and 142b together. The recessed portion 144b forms a mounting space 146b that is sized to receive the inner side surfaces of the lower tubes 124 and the lower surface of the bridge 126. As explained below, the mounting space 146b is preferably designed to provide a smooth contoured connection with the lower tubes 124 and the bridge 126. In other words, the mounting space 146b of the cover 116b is shaped and arranged to provide a very attractive integrated appearance.

The cover 116b has a plurality of mounting holes 160b that align with the mounting holes 160a of the rigid holder 116a such that the cover 116b is fastened between the front suspension fork 14 and the holder 116a. As mentioned above, cover 116b has a recess 141b with a pair of holes 164b that align with the holes 164a of the holder 116a for receiving bolts 166 therethrough. The rear support portion 142b has a pair of threaded mounting holes or nuts 184b that are threaded to receive bolts 168 for securing the rear fender 150 thereto. The rear fender 150 is adjustably mounted to the rear portion 142b in a longitudinal direction.

Third Embodiment

Referring now to FIGS. 9–12, a multi-purpose mounting member 216 is illustrated in accordance with the third embodiment of the present invention. This embodiment is a further modification of the second embodiment in that the holder 216a and the cover 216b of this third embodiment have each been split into two pieces. In view of the similarities between this third embodiment and the first and second embodiments, this third embodiment will not be discussed in detail herein. Rather, it will be apparent to those skilled in the art from this disclosure that the identical or similar structures of this embodiment function in an identical or similar manner as in the first and second embodiments.

In this embodiment, the rigid holder 216a is a two piece metallic member that basically includes a rigid front support portion 240a, which is substantially identical to front support portion 140a, and a rigid rear support portion 242a which is substantially identical to rear support portion 142a. The cover 216b is a two piece plastic member that basically includes a flexible front support portion 240b, which is substantially identical to front support portion 140b, and a flexible rear support portion 242b, which is substantially identical to rear support portion 142b. Thus, the holder 216a acts as a support for the cover 216b in the same manner as the second embodiment discussed above.

As seen in FIGS. 9–12, the multi-purpose mounting member 216 is especially designed to adjustable support both the fenders 248 and 255 and fixedly support at least one accessory component via bolts 262. The accessory components other than the fenders 248 and 250 include, but are not limited to, the accessory components of the second embodiment, e.g., the electrical control box 149, the lamp 151, the rechargeable lamp 153 and the dual lamp 155 with the carrier 157 with elastic netting 159.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A multi-purpose mounting member for a bicycle fork, comprising:

a rigid front support portion having a first end configured to be located adjacent the bicycle fork and a second end with a front accessory attachment portion located longitudinally between said first and second ends, said first end having a first end surface and said second end having a second end surface longitudinally spaced from said first end surface, said front accessory attachment portion having a longitudinally extending upper surface located between said first and second end surfaces and facing substantially in an upward direction when mounted to the bicycle fork and a longitudinally extending lower surface facing substantially in a downward direction that is substantially opposite to said upper direction when mounted to the bicycle fork, at least one of said upper and lower surfaces having an accessory mounting structure;

a rear support portion having a first end coupled to said front support portion by a recessed portion to form a mounting recess between said front and rear support portions with a portion of the bicycle fork being receivable in said mounting recess, at least one of said first ends of said front and rear support portions being configured with at least one fork mounting portion to be fixedly coupled to the bicycle fork, said mounting recess being defined by a first end surface of said first end of said rear support portion said first end surface of said front support portion and said recessed portion; and at least one of several accessory components being fixedly coupled to said front support portion via said accessory mounting structure of said front accessory attachment portion, said at least one of several accessory components having a mounting portion at least partially overlying one of said upper and lower surfaces of said front accessory attachment portion such that said mounting portion of said at least one of several accessory components overlaps said front accessory attachment portion in the vertical direction said multi-purpose mounting member having an overall longitudinal arc shape in order to follow the annular circumference of a bicycle wheel that is coupled to the bicycle fork.

2. A multi-purpose mounting member according to claim 1, wherein said at least one of said several accessory components includes a fender.

3. A multi-purpose mounting member according to claim 2, wherein said fender is adjustably coupled to said front support portion.

4. A multi-purpose mounting member according to claim 1, wherein said rear support portion further includes a rear accessory attachment portion.

5. A multi-purpose mounting member according to claim 4, wherein said rear accessory attachment portion has a fender adjustably coupled thereto.

6. A multi-purpose mounting member according to claim 5, wherein said at least one of said several accessory components includes a fender.

7. A multi-purpose mounting member according to claim 1, wherein said at least one of said several accessory components includes an electrical control box.

8. A multi-purpose mounting member according to claim 1, wherein said at least one of said several accessory components includes a lamp.

9. A multi-purpose mounting member according to claim 2, wherein said at least one of said several accessory components includes a lamp.

10. A multi-purpose mounting member according to claim 9, wherein said at least one of said several accessory components includes a carrier.

11. A multi-purpose mounting member according to claim 1, wherein said at least one of said several accessory components is fixedly coupled to said front accessory attachment portion of said front support portion via at least one bolt and nut arrangement.

12. A multi-purpose mounting member according to claim 1, wherein said mounting recess extends in a transverse direction in order to receive a cross member of the bicycle fork that extends between a pair of legs of the bicycle fork.

13. A multi-purpose mounting member according to claim 1, wherein said front and rear support portions and said recessed portion are integrally formed together as a one-piece, unitary member.

14. A multi-purpose mounting member according to claim 13, wherein said first end of said front support portion flares outwardly relative to said second end of said front support portion such that said front support portion has an upper surface that slopes upwardly as said upper surface approaches said first end of said front support portion.

15. A multi-purpose mounting member according to claim 1, wherein said first end of said front support portion flares outwardly relative to said second end of said front support portion such that said upper surface slopes upwardly as said upper surface approaches said first end of said front support portion.

16. A multi-purpose mounting member according to claim 1, wherein said at least one of said several accessory components includes a fender that is adjustably coupled to said front support portion via at least one bolt and nut arrangement.

17. A multi-purpose mounting member according to claim 1, wherein said at least one of said several accessory components includes a fender that is adjustably coupled to said rear support portion via at least one bolt and nut arrangement.

18. The multi-purpose mounting member according to claim 2, wherein said fender includes an integrated lamp mounted therein.

19. The multi-purpose mounting member according to claim 1, wherein said rear support portion includes a second end with a second end surface longitudinally spaced rearwardly from said first end surface of said first end of said rear support portion such that said front and rear support portions are arranged on opposite longitudinal sides of the bicycle fork.

20. The multi-purpose mounting member according to claim 1, wherein said rear support portion further includes a rear accessory attachment portion with a longitudinally extending rear fender coupled thereto, and said at least one of said several accessory components includes a front fender that is a separate member from said rear fender.

21. The multi-purpose mounting member according to claim 1, wherein both said upper and lower surface of said accessory attachment portion have an accessory mounting structure, and said at least one of said several accessory components includes a pair of accessory components with one of said accessory components coupled to said accessory mounting structure of said lower surface of front accessory attachment portion and the other of said accessory components coupled to said accessory mounting structure of said upper surface of said front accessory attachment portion.

22. The multi-purpose mounting member according to claim 21, wherein
said accessory component coupled to said accessory mounting structure of said lower surface of front accessory attachment portion is a fender and said accessory component coupled to said accessory mounting structure of said upper surface of said front accessory attachment portion is a lamp.

23. The multi-purpose mounting member according to claim 22, wherein
said at least one of several accessory components further includes a carrier coupled to said accessory mounting structure of said upper surface of said front accessory attachment portion.

24. A multi-purpose mounting member for a bicycle fork, comprising:
a rigid front support portion having a first end configured to be located adjacent the bicycle fork and a second end with a front accessory attachment portion;
a rear support portion having a first end coupled to said front support portion to form a mounting space between said front and rear support portions with a portion of the bicycle fork being receivable in said mounting space, at least one of said front and rear support portions being configured with at least one fork mounting portion to be fixedly coupled to the bicycle fork; and
at least one of several accessory components being fixedly coupled to said front support portion via said front accessory attachment portion,
said front and rear support portions being connected by a recessed portion that forms a part of said mounting space between said front and rear support portions, said front and rear support portions and said recessed portion being formed of two pieces with a first of said pieces being integrally formed together as a one-piece, unitary member of a rigid material and a second of said pieces being integrally formed together as a one-piece, unitary member of a less rigid material that overlies said first of said pieces.

25. A multi-purpose mounting member according to claim 24, wherein
said second of said pieces forms an upper surface of said front support portion, said upper surface of said front support portion at said first end flares outwardly relative to said second end of said front support portion such that said upper surface of said front support portion slopes upwardly as said upper surface approaches said first end of said front support portion.

26. The multi-purpose mounting member according to claim 24, wherein
said multi-purpose mounting member has an overall longitudinal arc shape in order to follow the annular circumference of a bicycle wheel that is coupled to the bicycle fork.

27. A multi-purpose mounting member for a bicycle fork, comprising:
a rigid front support portion having a first end configured to be located adjacent the bicycle fork and a second end with a front accessory attachment portion;
a rear support portion having a first end coupled to said front support portion to form a mounting space between said front and rear support portions with a portion of the bicycle fork being receivable in said mounting space, at least one of said front and rear support portions being configured with at least one fork mounting portion to be fixedly coupled to the bicycle fork; and
at least one of several accessory components being fixedly coupled to said front support portion via said front accessory attachment portion,
said front support portion being formed of two front pieces with a first of said front pieces being formed of a rigid material and a second of said front pieces being formed of a less rigid material that overlies said first of said front pieces.

28. A multi-purpose mounting member according to claim 27, wherein
said first of said front pieces is formed of a metallic material and said second of said front pieces is formed of a non-metallic material.

29. A multi-purpose mounting member according to claim 27, wherein
said rear support portion is formed of two rear pieces with a first of said rear pieces being formed of a rigid material and a second of said rear pieces being formed of a less rigid material that overlies said first of said rear pieces.

30. A multi-purpose mounting member according to claim 27, wherein
said second of said front pieces forms an upper surface of said front support portion, said upper surface of said front support portion at said first end flares outwardly relative to said second end of said front support portion such that said upper surface of said front support portion slopes upwardly as said upper surface approaches said first end of said front support portion.

31. A multi-purpose mounting member according to claim 29, wherein
said first of said front pieces is formed of a metallic material and said second of said front pieces is formed of a non-metallic material, and
said first of said rear pieces is formed of a metallic material and said second of said rear pieces is formed of a non-metallic material.

32. The multi-purpose mounting member according to claim 27, wherein
said multi-purpose mounting member has an overall longitudinal arc shape in order to follow the annular circumference of a bicycle wheel that is coupled to the bicycle fork.

33. A multi-purpose mounting member for a bicycle fork, comprising:
a rigid front support portion having a first end configured to be located adjacent the bicycle fork and a second end with a front accessory attachment portion;
a rear support portion having a first end coupled to said front support portion to form a mounting space between said front and rear support portions with a portion of the bicycle fork being receivable in said mounting space, at least one of said front and rear support portions being configured with at least one fork mounting portion to be fixedly coupled to the bicycle fork; and
at least one of several accessory components being fixedly coupled to said front support portion via said front accessory attachment portion,
said rear support portion being formed of two rear pieces with a first of said rear pieces being formed of a rigid material and a second of said rear pieces being formed of a less rigid material that overlies said first of said rear pieces.

34. The multi-purpose mounting member according to claim 33, wherein
said multi-purpose mounting member has an overall longitudinal arc shape in order to follow the annular circumference of a bicycle wheel that is coupled to the bicycle fork.

35. A multi-purpose mounting member for a bicycle fork, comprising:
a rigid front support portion having a first end configured to be located adjacent the bicycle fork and a second end with a front accessory attachment portion located between said first and second ends, said first end having a first end surface and said second end having a second end surface, said front accessory attachment portion having an upper surface located between said first and second end surfaces and facing substantially in an upward direction when mounted to the bicycle fork and a lower surface facing substantially in a downward direction that is substantially opposite to said upper direction when mounted to the bicycle fork, at least one of said upper and lower surfaces having an accessory mounting structure;
a rear support portion having a first end coupled to said front support portion to form a mounting space between said front and rear support portions with a portion of the bicycle fork being receivable in said mounting space, at least one of said first ends of said front and rear support portions being configured with at least one fork mounting portion to be fixedly coupled to the bicycle fork, said first end of said rear support portion having a first end surface forming part of said mounting space together with said first end surface of said front support portion; and
at least one of several accessory components being fixedly coupled to said front support portion via said accessory mounting structure of said front accessory attachment portion,
said front accessory attachment portion including at least one hole extending between said upper and lower surfaces, and said at least one of said several accessory components being mounted to at least one of said upper and lower surfaces using said at least one hole.

36. The multi-purpose mounting member according to claim 35, wherein said multi-purpose mounting member has an overall longitudinal arc shape in order to follow the annular circumference of a bicycle wheel that is coupled to the bicycle fork.

37. The multi-purpose mounting member according to claim 35, wherein
both said upper and lower surface of said accessory attachment portion have an accessory mounting structure with said at least one hole extending therebetween, and said at least one of said several accessory components includes a pair of accessory components with one of said accessory components coupled to said lower surface of front accessory attachment portion and the other of said accessory components coupled to said upper surface of said front accessory attachment portion.

38. The multi-purpose mounting member according to claim 37, wherein
said accessory component coupled to said lower surface of front accessory attachment portion is a fender and said accessory component coupled to said upper surface of said front accessory attachment portion is a lamp.

39. The multi-purpose mounting member according to claim 38, wherein
said at least one of several accessory components further includes a carrier coupled to said upper surface of said front accessory attachment portion.

* * * * *